Feb. 26, 1924.　　　　　　　　　　　　　　　　1,484,815
G. DE BOTHEZAT ET AL
BAROGRAPH
Filed April 18, 1922
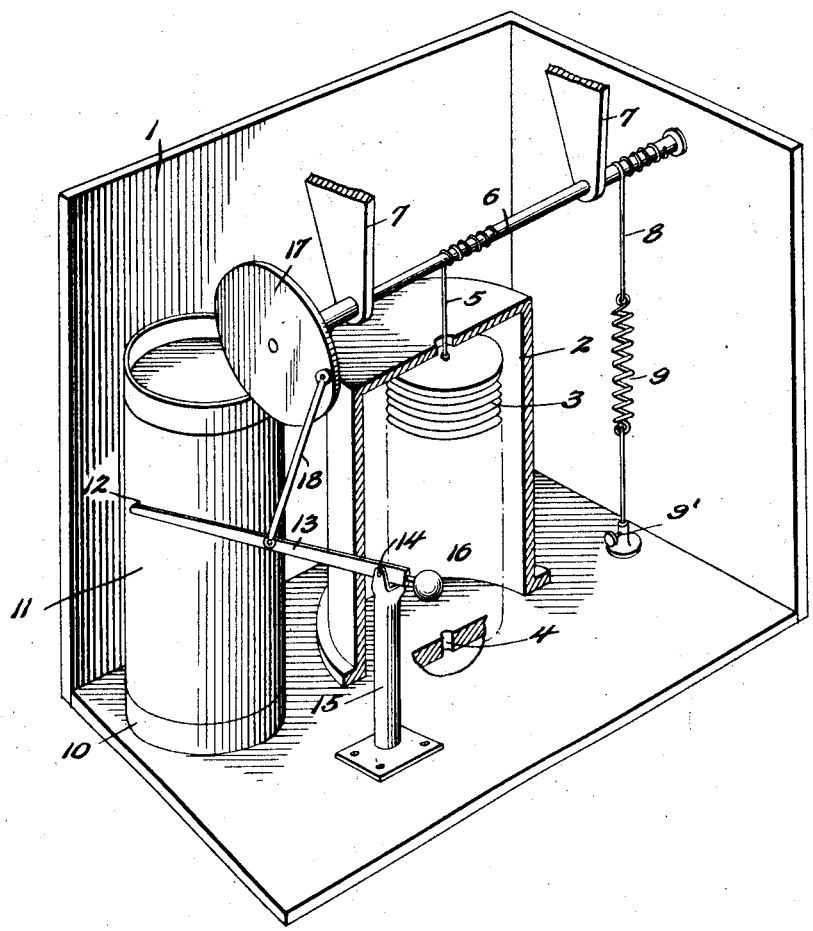

Patented Feb. 26, 1924.

1,484,815

UNITED STATES PATENT OFFICE.

GEORGE DE BOTHEZAT AND IVAN I. EREMEEFF, OF DAYTON, OHIO.

BAROGRAPH.

Application filed April 18, 1922. Serial No. 555,198.

*To all whom it may concern:*

Be it known that we, Dr. GEORGE DE BOTHEZAT and IVAN I. EREMEEFF, citizens of Russia, residing at 205 Lexington Ave., Dayton, in the county of Montgomery and State of Ohio, have invented certain new and useful Improvements in Barographs (Case D), of which the following is a specification.

This invention relates to barographs, the object being to produce simple mechanism for accurately recording the altitude of an aircraft by taking advantage of the variation of air pressures at the ground or sea level and at different altitudes as the aircraft is ascending and descending.

The invention consists in the novel construction, combination and arrangement hereinafter more fully described in connection with the accompanying drawings.

The accompanying drawing represents a broken away perspective view of the barograph.

The instrument comprises a casing 1 which is airtight. Within the casing 1 is a compartment 2 and in the latter is a flexible bellows 3 which stands upright and has the bottom thereof attached to the bottom of the compartment 2. A vent 4 in the bottom of casing 1 keeps the bellows 3 in constant free and open communication with the outside atmosphere.

The top head of the bellows 3 is movable up and down and has attached to it a flexible connection 5 extending upwardly and wound around a rotatable shaft 6 mounted in bearings 7 within the casing 1. Another flexible connection 8 is wrapped in the reverse direction around the shaft 6 and has associated therewith a spring 9 and adjustable holding means 10 by which the spring 9 may be given more or less tension to balance the shaft 7 and recording means to be described.

The recording means embodies a revoluble drum 10 containing a spring motor or clock mechanism for imparting rotation thereto at uniform speed. The drum 10 carries a record sheet 11 suitably calibrated. A stylus 12 makes record on the sheet 11 and is carried by a recording arm 13 mounted on a pivot 14 on a support 15, such as a post. A counterbalance 16 is threaded and adjustable on one end of the arm 13. On the end of the shaft 6 is a disk 17 from which a link 18 extends to the arm 13.

The compartment 2 is merely a thermal insulator, the pressure being always the same as in the casing 1. At ground level the pressure in the bellows 3 is the same as the pressure in the casing 1. When ascending, the pressure outside the casing and inside the bellows decreases. This causes the bellows 3 to contract against the tension of spring 9 which controls the relation between the pressure difference and the deflection. The connection 5 is pulled downwardly turning shaft 6 and raising arm 13 causing stylus 12 to trace a line on the record sheet 11.

When descending, the reverse conditions hold. The pressure outside the casing and inside the bellows increases, expanding the bellows with the aid of the spring 9.

The graduation lines on the record sheet are spaced in such manner as to take care of variations in the movement of the arm 13 and stylus 12, it being apparent that the stylus 12 will move faster in the center of the drum than near the ends thereof and therefore the space between the graduation lines is greater at the center of the record sheet.

We claim:

1. In a barograph, an air tight casing, a flexible bellows therein in constant open communication with the atmosphere, a rotatable shaft, a flexible connection between said shaft and flexible bellows serving to rotate said shaft as the flexible bellows contracts, means for rotating said shaft in the reverse direction when the flexible bellows expands, and recording means operable by said shaft.

2. In a barograph, an air tight casing, a flexible bellows therein in constant open communication with the atmosphere, a static compartment enclosing said flexible bellows, a rotatable shaft, a flexible connection between said shaft and flexible bellows serving to rotate said shaft as the flexible bellows contracts, means for rotating said shaft in the reverse direction when the flexible bellows expands, and recording means operable by said shaft.

3. In a barograph, an air tight casing, a flexible bellows therein in constant open communication with the atmosphere, a rotatable shaft, a flexible connection between said shaft and flexible bellows serving to rotate said shaft as the flexible bellows contracts, adjustable tension means for rotating said shaft in the reverse direction when the flexible bellows expands, and recording means operable by said shaft.

4. In a barograph, an air tight casing, a flexible bellows therein in constant open communication with the atmosphere, a rotatable shaft, a flexible connection between said shaft and flexible bellows serving to rotate said shaft as the flexible bellows contracts, means for rotating said shaft in the reverse direction when the flexible bellows expands, and recording means operable by said shaft, said recording means embodying a rotary record sheet carrying drum, a recording arm carrying a stylus bearing against said drum, and a linkage between said arm and shaft.

5. In a barograph, an air tight casing, a flexible bellows therein in constant open communication with the atmosphere, a rotatable shaft, a flexible connection between said shaft and flexible bellows serving to rotate said shaft as the flexible bellows contracts, means for rotating said shaft in the reverse direction when the flexible bellows expands, and recording means operable by said shaft, said recording means embodying a rotary record sheet carrying drum, a recording arm carrying a stylus bearing against said drum, a linkage between said arm and shaft, and adjustable counterbalancing means for said recording arm.

In testimony whereof we affix our signatures.

GEORGE DE BOTHEZAT.
IVAN I. EREMEEFF.